United States Patent [19] [11] Patent Number: 4,471,285
Kawada et al. [45] Date of Patent: Sep. 11, 1984

[54] SYSTEM FOR VARIABLE SPEED OPERATION OF INDUCTION MOTORS

[75] Inventors: Shigeki Kawada, Hino; Hiroshi Ishida, Hamura, both of Japan

[73] Assignee: Fujitsu Fanuc Limited, Tokyo, Japan

[21] Appl. No.: 347,423

[22] Filed: Feb. 10, 1982

Related U.S. Application Data

[63] Continuation-in-part of Ser. No. 131,671, Mar. 19, 1980, abandoned.

[51] Int. Cl.³ .............................................. H02P 5/40
[52] U.S. Cl. .................................... 318/808; 318/812
[58] Field of Search ............................... 318/798–803, 318/805, 807–812, 606

[56] References Cited

U.S. PATENT DOCUMENTS

| | | | |
|---|---|---|---|
| 3,346,794 | 10/1967 | Stemmler | 318/810 |
| 3,353,081 | 11/1967 | Stemmler | 318/810 |
| 3,538,420 | 11/1970 | Klein | 318/810 |
| 3,585,488 | 6/1971 | Gutt et al. | 318/811 |
| 3,662,247 | 5/1972 | Schieman | 318/808 |
| 3,775,652 | 11/1973 | Bowler et al. | 318/810 |
| 3,886,430 | 5/1975 | Meir | 318/807 |
| 4,028,600 | 6/1977 | Blaschke et al. | 318/810 |
| 4,047,083 | 9/1977 | Plunkett | 318/807 |
| 4,078,192 | 3/1978 | Fultz | 318/799 |
| 4,086,623 | 4/1978 | Jensen | 318/808 |
| 4,272,715 | 6/1981 | Matsumoto | 318/807 |
| 4,322,671 | 3/1982 | Kawada et al. | 318/811 |
| 4,322,672 | 3/1982 | Walker | 318/808 |
| 4,356,544 | 10/1982 | Ono et al. | 318/811 |

Primary Examiner—David Smith, Jr.
Attorney, Agent, or Firm—Staas & Halsey

[57] ABSTRACT

A system for operating an induction motor at variable speeds, which is particularly effective when an induction motor is to rotate at a very low speed of several r.p.m. or less. The system produces polyphase sinusoidal signals of a frequency which corresponds to the difference between a command speed and the actual speed of the induction motor, the number of phases of the sinusoidal signals being equal to the number of phases at which the induction motor operates, a sinusoidal carrier wave having a constant frequency of from 50 to 400 Hz and a constant amplitude, and polyphase induction motor drive signals formed by modulating the carrier wave by the polyphase sinusoidal signals. The induction motor drive signals are amplified up to a prescribed value and then applied to the induction motor to energize the stator for each respective input phase so that the rotor of the induction motor will be caused to rotate at a very low speed.

2 Claims, 13 Drawing Figures

Fig. 4

| Count of up-down counter | Address of ROM 4g, 4h | data in ROM 4g | data in ROM 4h |
|---|---|---|---|
| 0 | 0 | Ns0 = 10000000 | Nc0 = 11111111 |
| 1 | 1 | Ns1 | Nc1 |
| 2 | 2 | Ns2 | Nc2 |
| 63 | 63 | Ns63 = 11111111 | Nc63 = 10000000 |
| 127 | 127 | Ns127 = 10000000 | Nc127 = 00000000 |
| 191 | 191 | Ns191 = 00000000 | Nc191 = 10000000 |
| 255 | 255 | Ns255 = 10000000 | Nc255 = 11111111 |

SYSTEM FOR VARIABLE SPEED OPERATION OF INDUCTION MOTORS

CROSS REFERENCE TO RELATED APPLICATION

This is a continuation-in-part application Ser. No. 131,671, filed Mar. 19, 1980.

BRIEF SUMMARY OF THE INVENTION

This invention relates to a system for operating an induction motor at variable speeds, and more particularly to a system that enables an induction motor to be operated at an extremely low speed.

When the table of a machine tool carries a workpiece to a prescribed position, there are instances where this movement must be effected at a high speed. It is also required that the table be moved slowly at times, as when the workpiece is subjected to a slow machining operation. Hence the motor which is connected to the feed shaft that moves the table ordinarily has its speed controlled over a very wide range of from 400 r.p.m. to an extremely slow speed on the order of 0.1 r.p.m, by way of example. DC motors are well suited for this wide range of speed control and are therefore employed to drive the feed shaft in a machine tool. It has become possible to vary the speed of an induction motor over a broad range through the utilization of variable frequency control systems, and induction motors, which are easy to inspect and maintain, are now finding use in such applications as spindle drive motors for machine tools. However, it is not possible for an induction motor to run stably at a low speed of several r.p.m. or less through the use of a control system that merely reduces the operating frequency. The reason for this is as follows. The magnitude of a rotating magnetic flux which is linked to the secondary conductor of an induction motor is proportional to a voltage derived by subtracting a voltage drop, which is due to the primary resistance and primary leakage reactance, from the terminal voltage applied to the primary winding of the motor. This terminal voltage becomes small at an extremely low frequency but, since a drop in the above-mentioned resistance and leakage reactance remains substantially constant irrespective of frequency, there is an increase in the disparity between the magnitude of the rotating magnetic flux and the terminal voltage as the frequency assumes a very small value. Difficulties are encountered in controlling and accurately detecting the rotating magnetic flux and the secondary current which it induces in the secondary conductor. In other words, smooth and stable speed control cannot be achieved where there are fluctuations in load torque. Further, while it might be possible to conceive of an arrangement in which a prescribed torque could be produced by sending a large current into the primary side of the induction motor when rotating the motor at a low speed of several r.p.m., the magnetic circuit of the induction motor would saturate and this would prevent the production of the desired torque. These and other problems raise doubts about the expediency of the above system.

In view of the foregoing it has not been possible to employ an induction motor in the driving of a table that is turned through one revolution over a period of several minutes. Accordingly, replacing all of the conventional motors used in machine tools with the readily maintained and inspected squirrel-cage induction motor has not been possible, and the partial use of DC motors has been unavoidable.

It is therefore an object of the present invention to provide a variable speed operating system that is capable of rotating an induction motor at a very low speed.

It is another object of the present invention to provide a variable speed operating system that is capable of rotating an induction motor stably in a region of very low speeds.

It is still another object of the present invention to provide a variable speed operating system that is capable of rotating an induction motor stably while producing a prescribed torque in a region of very low speeds.

Other and further objects, features and advantages of the invention will appear more fully from the following description.

BRIEF DESCRIPTION OF THE DRAWINGS

The present invention will be more clearly understood by referring to the following detailed description when considered in conjunction with the accompanying drawings wherein:

FIG. 4 is a diagram for explaining a function of ROMs which store digital values approximating a sine wave and a cosine wave;

DETAILED DESCRIPTION OF THE PREFERRED EMBODIMENT

Figure 1:
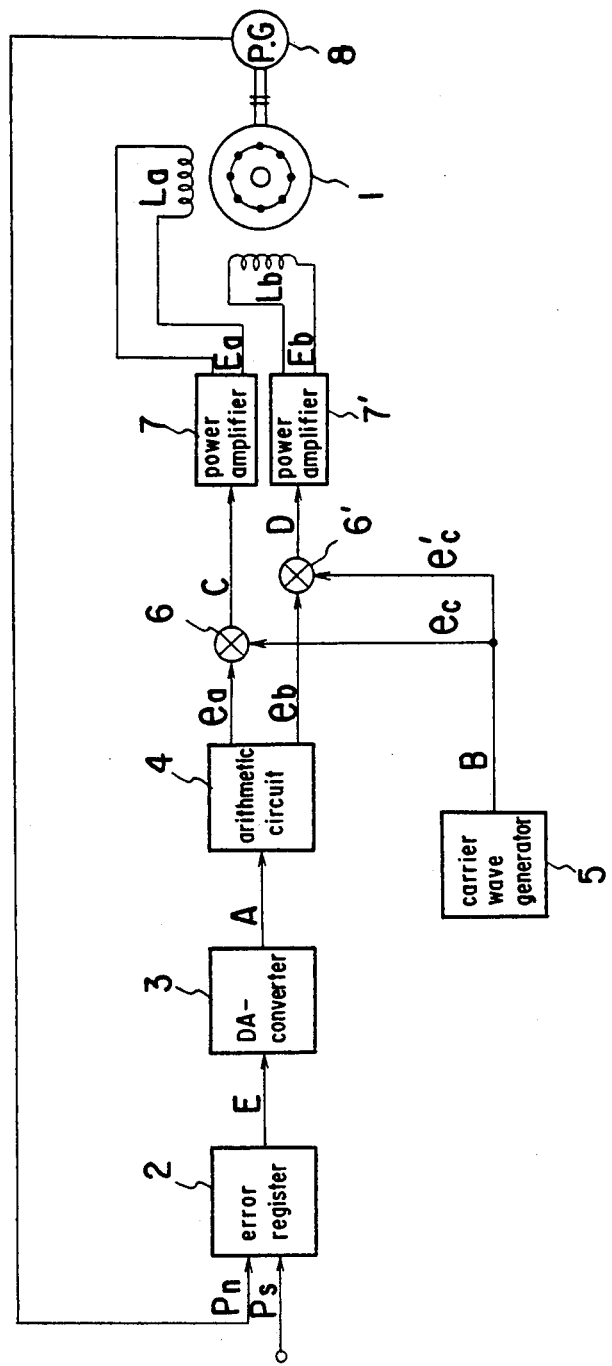
FIG. 1 is a block diagram of a two-phase induction motor drive circuit in accordance with a variable speed operating system of the present invention.

Illustrated in FIG. 1 is a block diagram of a two-phase induction motor drive circuit in accordance with a variable speed operating system of the present invention. The arrangement of FIG. 1 includes a two-phase induction motor 1 having stator windings $L_a$, $L_b$; an error register 2 comprising means such as a reversible counter for computing the difference between two input pulse trains $P_s$ and $P_n$, where the pulse train $P_s$ serves as a speed command signal, and is supplied from outside the circuitry shown, while the pulse train $P_n$ is indicative of actual motor speed and is the output of a pulse generator 8 coupled directly to the induction motor 1; a digital-to-analog (D-A) converter 3 for converting a error signal E which is indicative of the difference stored in the error register 2 into an analog error voltage signal A, and an arithmetic unit 4 for producing two-phase sinusoidal waves $e_a$, $e_b$ that are displaced from each other by 90 degrees, the frequency and peak value of the sinusoidal waves $e_a$, $e_b$ varying in proportion to the size of the analog error voltage signal A obtained from D-A converter 3. In the present embodiment the arithmetic unit 4 produces two-phase output signals in order to operate the two-phase induction motor, but the unit can be adapted to produce N-phase signals in a situation where an N-phase induction motor is to be driven. The arrangement of FIG. 1 further includes a carrier wave generator 5 for generating a sinusoidal signal B having a constant amplitude as well as a constant frequency, such as 50 Hz, which is high in comparison to that of the two-phase sinusoidal waves $e_a$, $e_b$; multipliers 6, 6' for multiplying together the two-phase sinusoidal waves $e_a$, $e_b$ obtained from arithmetic unit 4, and carrier waves $e_c$, $e_c'$ of identical phase obtained from carrier wave generator 5, thereby to produce output signals C, D which are the carrier waves $e_c$, $e_c'$ as modulated by the sinusoidal waves $e_a$, $e_b$; and power amplifiers 7, 7' which amplify the outputs C, D of respective multipliers 6, 6' and then apply the amplified signals to stator windings $L_a$, $L_b$ as voltages $E_a$, $E_b$.

Figure 2:
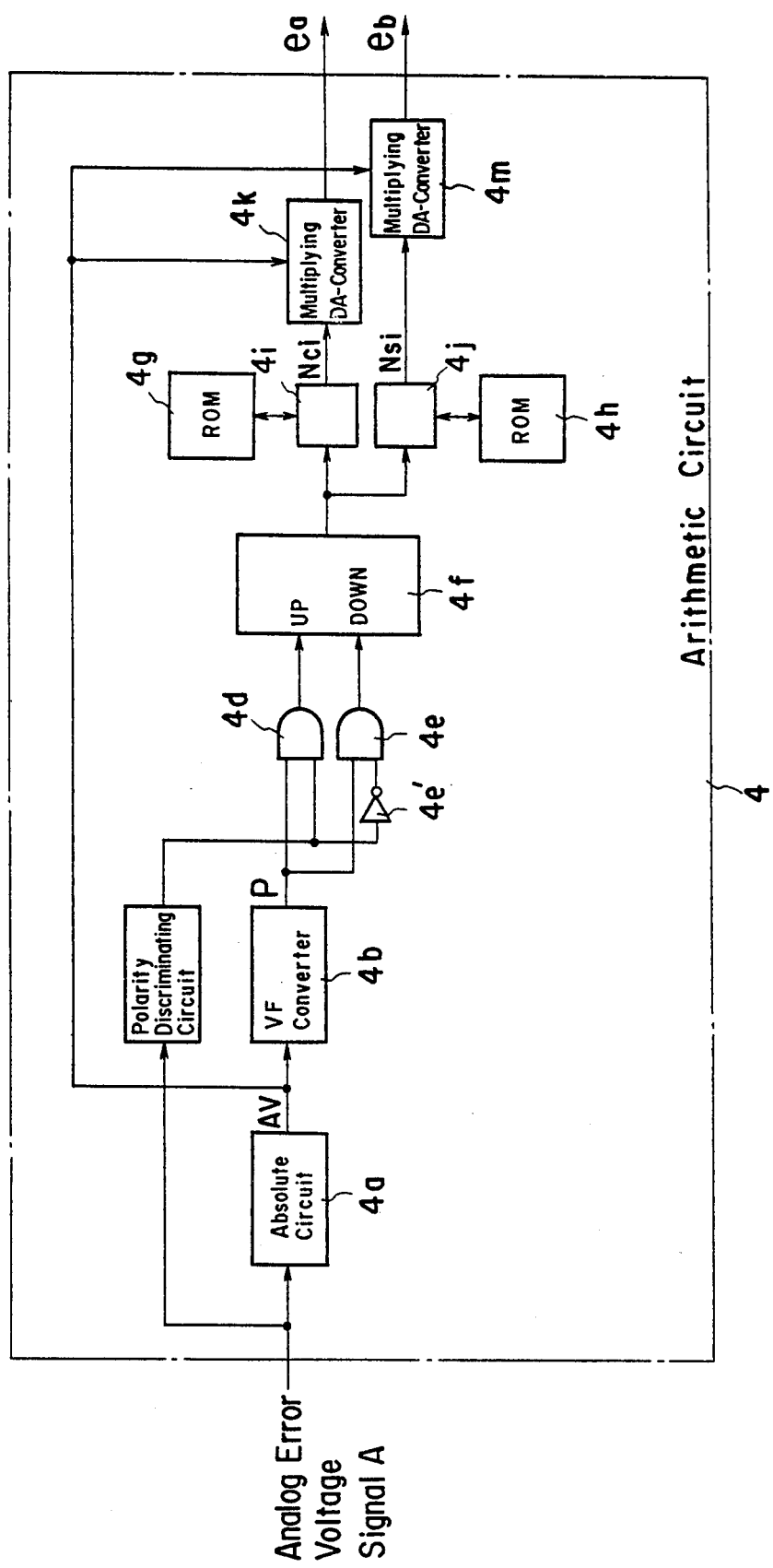
FIG. 2 is a block diagram of an arithmetic circuit disclosed is FIG. 1.
Figure 3:
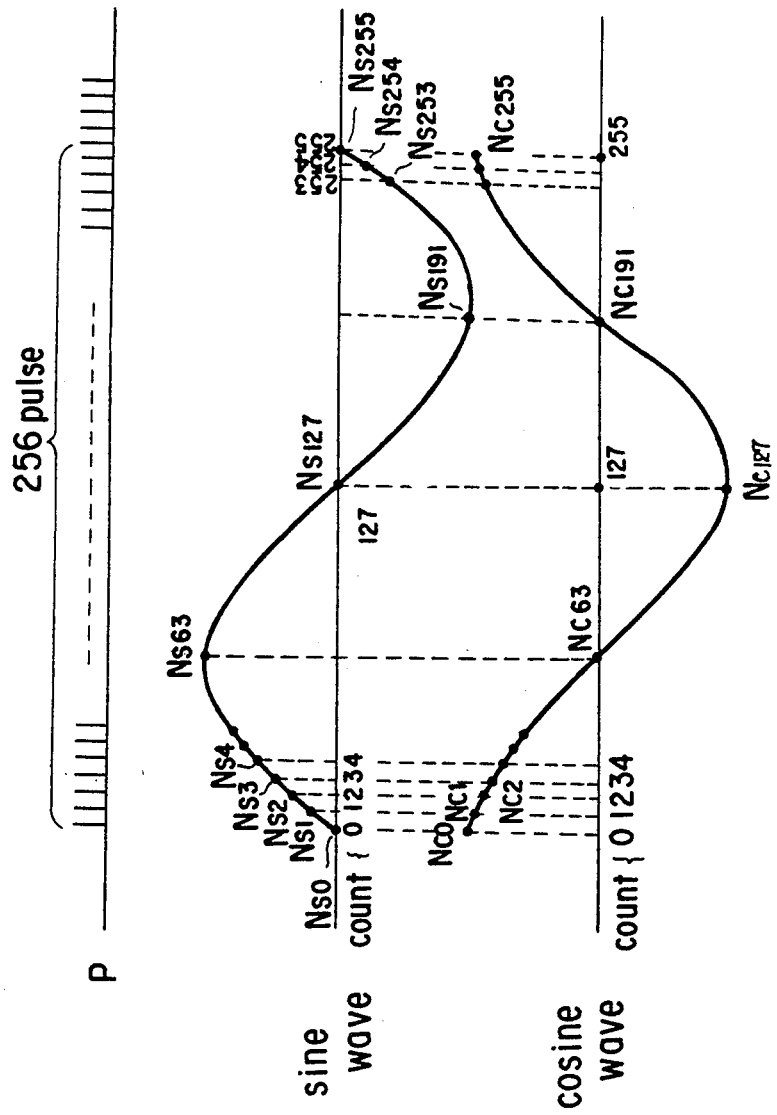
FIG. 3 is a waveform diagram of signals associated with various portions of the arithmetic circuit shown in FIG. 2.

Illustrated in FIG. 2 is a block diagram of the arithmetic circuit 4 in which an absolute value circuit 4a delivers an absolute value AV of the analog error voltage signal A to a voltage frequency converter (VF converter) 4b and a polarity discriminating circuit 4c for discriminating the polarity of the error voltage signal A generates a polarity signal PS which is logical "1" when the error voltage signal A has a positive value and is logical "0" when the error voltage signal A has a negative value. The polarity signal PS is respectively impressed to one input terminal of AND gate 4d and one input terminal of AND gate 4e through a NOT gate 4e'. In response to the absolute value AV, the VF converter 4b generates a pulse train P whose frequency is proportional to the size of the error voltage signals. The AND gate 4d passes the pulse train P when the polarity signal PS is logical "1" and the AND gate 4e passes the pulse train P when signal PS is logical "0". An up-down counter 4f increases its count by 1 every time the pulse of the pulse train P passes through the AND gate 4d and decreases the count by 1 every time the pulse of the pulse train P passes through the AND gate 4e, wherein the content of the up-down counter 4f is reset to zero after every 256 pulses up or down. The count of the up-down counter 4f indicates an address of each Read-Only-Memory (ROM) 4g and 4h which respectively stores the digital value Nci, Nsi (i=0,1, ... 255) approximating a sine wave and a cosine wave shown in FIG. 3. The relationship among the count of the up-down counter 4f, the address of the ROMs 4g, 4h and data stored in the ROMs 4g, 4h is shown in FIG. 4. In accordance with the count of the up-down counter 4f, each memory control circuit 4i, 4j respectively reads digital values Nci, Nsi (i=0,1 ... 255) from the ROM 4g, ROM 4j and delivers them to a multiplying DA-converter 4k, 4m. Each multiplying DA-converter 4k, 4m which is manufactured and sold as a trade name "DAC 08" by National Semi Conductor Co., has nine input terminals, eight of which receive the digital value Nci, Nsi from the ROM 4g, 4h and one of which receives the absolute value AV from the absolute circuit 4a. The multiplying DA-converter 4k, 4m, first of all converts the digital value Nci, Nsi to analog signals, then multiplies the analog signals and the absolute value AV and generates the result of the multiplication as a cosine wave signal $e_a$ and a sine wave signal $e_b$ whose both frequencies and amplitudes are proportional to the size of the analog error voltage signal A.

Figure 5:
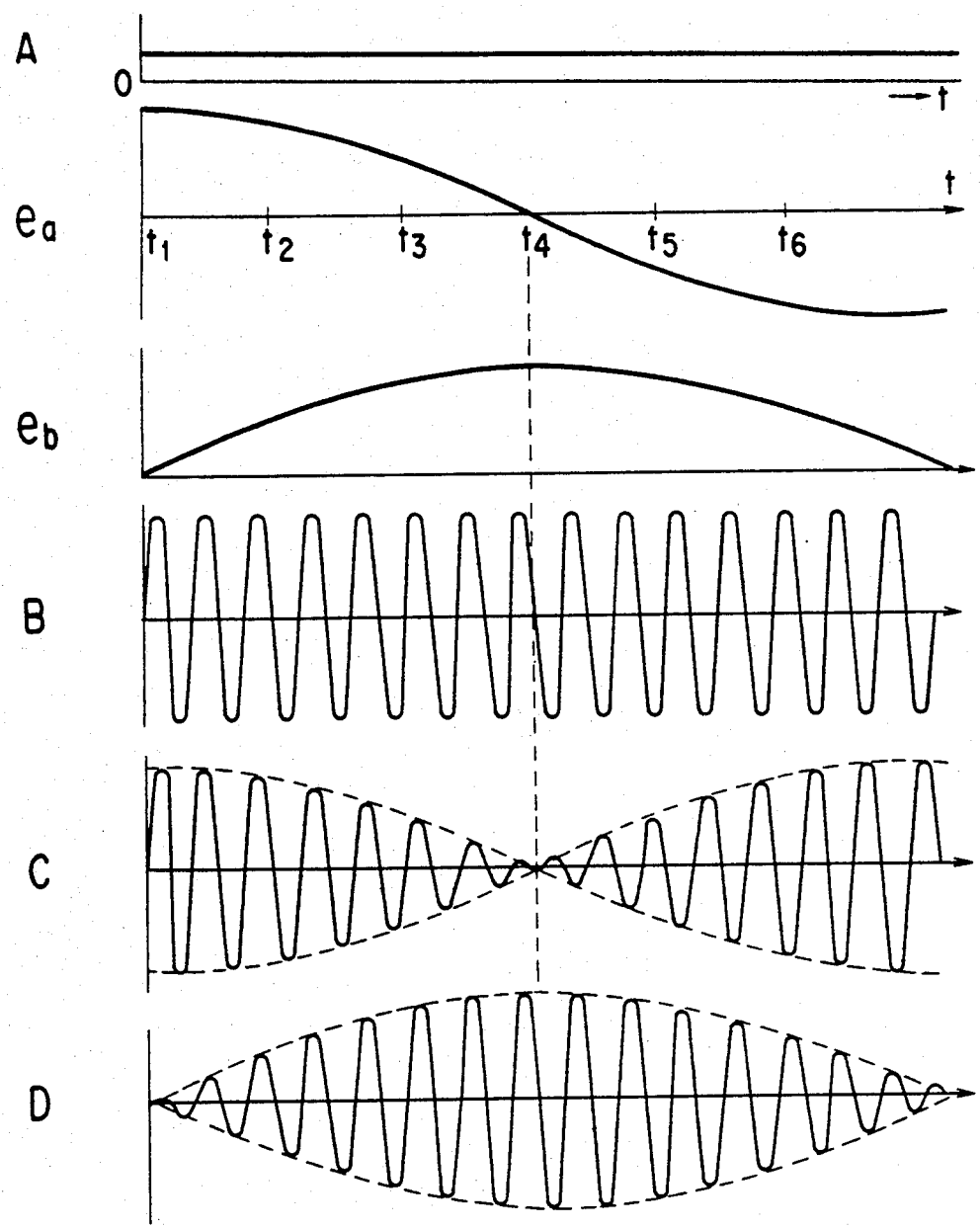
FIG. 5 is a waveform diagram of signals associated with various portions of the two-phase induction motor drive circuit shown in FIG. 1.

In terms of operation, the error register 2 receives at one of its input terminals the speed command pulse train $P_s$ of a prescribed frequency which is determined in accordance with a specified motor speed. The error register 2 receives at its other input terminal the pulse train $P_n$ indicative of actual motor speed and substracts the number of pulses in this train from those in the pulse train $P_s$ to provide an error signal E which is indicative of the difference. The D-A converter 3 converts the digital error signal E into an analog error voltage signal A the level of which corresponds to the error signal E. The appearance of signal A can be understood from FIG. 5. The arithmetic unit 4 accepts the error voltage signal A and generates a pair of sinusoidal signals $e_a$, $e_b$, shown in FIG. 5, which differ in phase by 90 degrees and have a frequency and amplitude that depend upon the size of the error voltage signal A. Meanwhile the carrier wave generator 5 produces the carrier wave B whose frequency and amplitude are constant, as depicted in FIG. 5, the carrier wave being applied to multipliers 6, 6' as respective carrier waves $e_c$, $e_c'$ of identical phase. The multipliers 6, 6' multiply the carrier waves $e_c$, $e_c'$ and arithmetic unit outputs $e_a$, $e_b$ to thereby modulate the carrier waves by the sinusoidal signals $e_a$, $e_b$ and thus produce the modulated outputs C, D shown in FIG. 5. These are then amplified by the power amplifiers 7, 7' into signals $E_a$, $E_b$ that are supplied to respective ones of the stator windings $L_a$, $L_b$ of two-phase induction motor 1. The induction motor responds in such a manner that an induced voltage appears in a secondary conductor owing to an alternation in flux attributed to the carrier wave frequency, the induced voltage giving rise to a secondary current that is large enough to generate a torque. In addition, the field established by the stator winding currents revolves as the sinusoidal outputs $e_a$, $e_b$ of arithmetic unit 4 vary in frequency, thereby producing a rotating field. What is of special note here is that the frequency of the sinusoidal signals $e_a$, $e_b$, namely the synchronous speed of the motor, must not be allowed to exceed a value which is half that of the carrier wave frequency. Moreover, a change in the speed of induction motor 1 is effected by changing the frequency of the speed command pulse train $P_s$.

A prescribed speed and torque are established when the modulated, very low frequency outputs C, D are impressed upon the induction motor 1. The principle which accounts for this may be explained as follows.

Figure 6A:
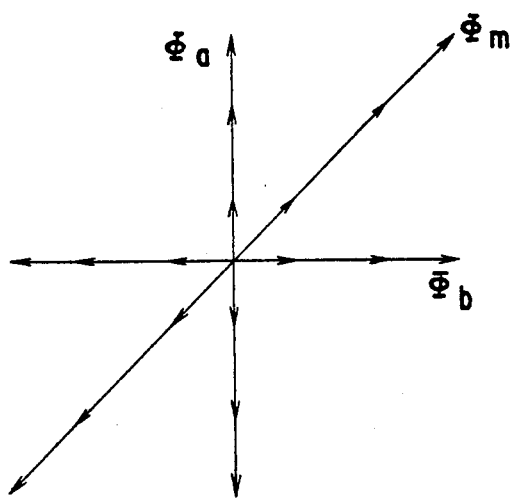
FIG. 6A is a vector diagram which illustrates magnetomotive force when only a carrier wave is applied to a two-phase induction motor and FIG. 6B is a vector diagram which illustrates magnetomotive force after a rotative component has been applied to the vector diagram of FIG. 6A.

Two-phase induction motor 1 cannot operate at very low speeds, for the reason set forth above, when the stator windings $L_a$, $L_b$ receive solely the signals $e_a$, $e_b$ having a frequency and amplitude which depend upon the error voltage at the output of error register 2. Furthermore, assume now that only the constant frequency and constant amplitude carrier wave output of carrier wave generator 5 is applied to the respective induction motor stator windings $L_a$, $L_b$ after having been split into the two portions $e_c$, $e_c'$ of identical phase. This will give rise to a magnetomotive force $\phi_a$ resulting from $E_a$ and a magnetomotive force $\phi_b$ resulting from $E_b$, and the magnetomotive forces will be of the same magnitude (that is, $\phi_a = \phi_b$) because $E_a$ and $E_b$ are identical in magnitude as well as phase. Accordingly, as shown in FIG. 6A, the resultant magnetomotive force $\phi_m$ between $\phi_a$ and $\phi_b$ merely alternates at a slope of 45 degrees, that is, at an angle of 45 degrees with respect to both $\phi_a$ and $\phi_b$.

Figure 6B:
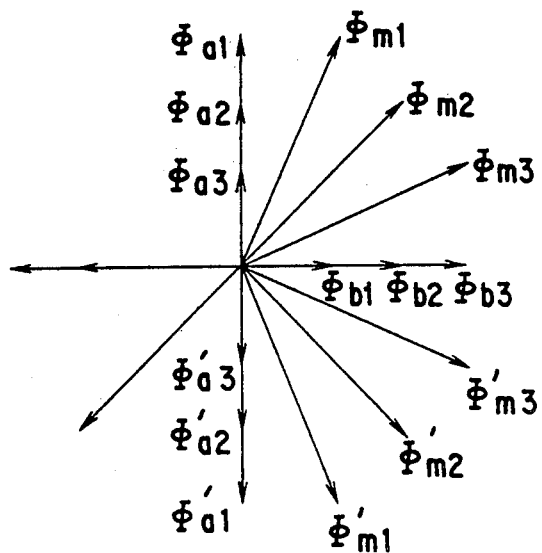

Such a condition cannot produce a rotating field. Thus, merely applying the carrier wave to the stator windings $L_a$, $L_b$ will not cause the induction motor to rotate. However, if the voltages $E_a$, $E_b$ applied to the stator windings $L_a$, $L_b$ can be made to undergo a slight step-by-step variation, a corresponding variation will occur in the magnitudes of the magnetomotive forces $\phi_a$, $\phi_b$, and the resultant magnetomotive force $\phi_m$ will rotate slowly, as depicted in FIG. 6B. More specifically, a rotating magnetic field is generated by applying a component that yields a turning effort, attributed to the outputs $e_a$, $e_b$ of arithmetic unit 4, to the carrier wave component which is incapable of producing such turning effort, while the carrier wave component results in an induced voltage large enough to cause a secondary current to flow in the secondary conductor. It is this feature that allows the rotor to rotate smoothly even at very low speeds.

Figure 7A:
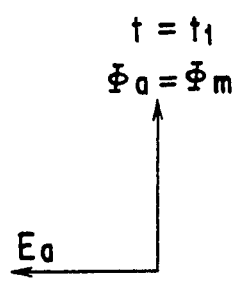
FIGS. 7A through 7F are vector diagrams in which the operating states of the two-phase induction motor drive circuit, shown in FIG. 1, are analyzed in terms of rotation of magnetomotive force with the passage of time.
Figure 7B:
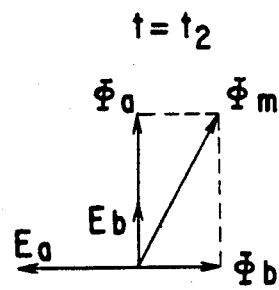
Figure 7C:
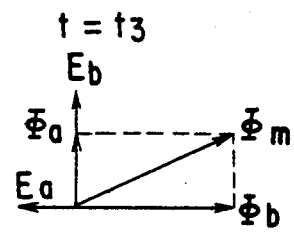
Figure 7D:
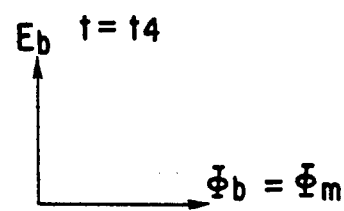
Figure 7E:
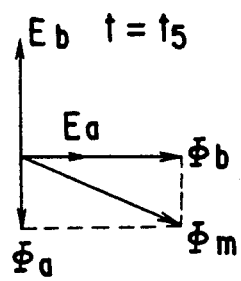
Figure 7F:
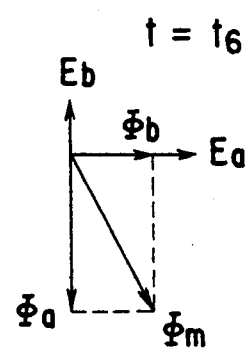

The operation of the two-phase induction motor drive circuit can be more fully understood from FIGS. 7A through F which give an analysis of such operation with the passage of time and in terms of the rotating field. The various times $t_1$, $t_2$, $t_3 \ldots t_5$, $t_6$ shown in FIG. 7 correspond to the points in time along the time axis of the respective signal waveforms in FIG. 5. In other words FIG. 7A through F illustrate the conditions under which the rotating field is produced. Thus FIG. 7A shows that only the modulated output voltage $E_a$ is present at time $t=t_1$, with output voltage $E_b$ being 90 degrees out of phase and having a magnitude of zero, so that the magnetomotive force $\phi_a$, which is attributed entirely to $E_a$, is the total magnetomotive force, i.e., $\phi_a=\phi_m$. FIG. 7B shows an instance where $E_a:E_b=\sqrt{3}:1$ at time $t=t_2$, so that both of the output voltages $E_a$, $E_b$ now contribute to the resultant magnetomotive force $\phi_m$ between the magnetomotive forces $\phi_a$, $\phi_b$, with $\phi_b$ being attributed to $E_b$. The vector of the resultant magnetomotive force $\phi_m$ has thus rotated through 30 degrees between times $t_1$ and $t_2$. FIG. 7C illustrates an instance where $E_a:E_b=1:\sqrt{3}$ at time $t=t_3$, with the vector of the resultant magnetomotive force $\phi_m$ having rotated through an additional 30 degrees. FIG. 7D shows that only the output voltage $E_b$ is present at time $t=t_4$, with output voltage $E_a$ being 90 degrees out of phase and having a magnitude of zero, so that the magnetomotive force $\phi_b$ is the total magnetomotive force, i.e., $\phi_b=\phi_m$. Here $\phi_m$ has rotated by an additional 30 degrees for a total of 90 degrees in comparison with its orientation at time $t=t_1$. FIG. 9E shows the condition at time $t=t_5$ and FIG. 7F at time $t=t_6$. It can be seen that the vector of the output voltage $E_a$ has reversed direction, and that this is accompanied by a reversal in the direction of the magnetomotive force vector $\phi_a$. The resultant magnetomotive force vector can thus be understood to continue rotating successively by 30-degree steps without altering direction. Thus the magnetomotive forces attributed to the respective output voltages $E_a$, $E_b$ also rotate smoothly owing to the mutual changes in magnitudes and directions of the $E_a$ and $E_b$ vectors. The two-phase induction motor can therefore run stably at a very low speed while generating a prescribed torque.

While the present invention has been described and illustrated in connection with a simple two-phase induction motor in order to facilitate the description, it is in no way limited to such an arrangement but can obviously be applied to induction motors that operate on three or more (N) phases. In such a case the arithmetic unit 4 would be required to generate N-phase output signals of a phase angle $2\pi/N$, and the number of multipliers and power amplifiers would have to agree with the number of phases N. It should also be understood that the feedback system in the circuitry of FIG. 1 may employ analog signals instead of the digital signals.

It has thus been shown that the system of the present invention makes it possible to operate a durable, maintenance-free squirrel-cage induction motor smoothly and stably while producing a prescribed torque, as in the case of a DC motor, even at a very low speed of several r.p.m. or less. The economic advantages of this are self-evident. The application of this operating system enables a squirrel-cage induction motor to be employed as a feed shaft drive motor in machine tools.

What we claim is:

1. A system for driving an induction motor on the basis of an error signal whose amplitude is proportional to a speed deviation between a command speed and the actual speed of the induction motor, comprising:
   sinusoidal signals generating circuit for generating polyphase sinusolidal signals of a frequency and amplitude that are porportional to and dependent upon the size of said speed deviation, said sinusoidal signals generating circuit includes:
   an absolute value circuit for generating an absolute value of the error signal;
   a voltage/frequency converter for generating a pulse train whose frequency is proportional to the size of the absolute value;
   an up-down counter for counting up or down the pulse train in accordance with a polarity of the error signal;
   a memory for storing digital values of cosine and sine waveforms at a plurality points; and
   multiplying DA-converters having one input which receives the digital value and another input which receives the absolute value, in which the digital values are read out of the memory in accordance with the count of the up-down counter which indicates the address of the memory and the muliiplying DA-converter generates sinusolidal signals whose both frequency and amplitude are proportional to the size of the absolute value;
   a carrier wave generator for generating a carrier wave;
   modulating means for amplitude modulating the carrier wave in dependence upon the polyphase sinusoidal signals; and
   means for impressing each amplitude modulated carrier wave signal to corresponding primary windings of the induction motor.

2. A system for driving an induction motor according to claim 1, wherein said modulating means comprises a plurality of multipliers.

* * * * *

UNITED STATES PATENT AND TRADEMARK OFFICE
CERTIFICATE OF CORRECTION

PATENT NO. : 4,471,285

DATED : SEPTEMBER 11, 1984

INVENTOR(S) : SHIGEKI KAWADA ET AL.

It is certified that error appears in the above-identified patent and that said Letters Patent is hereby corrected as shown below:

```
Col. 1, line  7, after "application", insert --of--;
        line 20, after "Hence", insert --,--.

Col. 5, line 26, after "words", insert --,--.

Claim 1, line 25, "muliiply-" should be --multiply--;
         line 26, "sinusolidal" should be --sinusoidal--.
```

Signed and Sealed this

Twenty-third Day of July 1985

[SEAL]

Attest:

DONALD J. QUIGG

Attesting Officer     Acting Commissioner of Patents and Trademarks